United States Patent
Knight-Newbury et al.

(10) Patent No.: US 6,988,577 B2
(45) Date of Patent: Jan. 24, 2006

(54) SAFETY ARRANGEMENT FOR A MOTOR VEHICLE

(75) Inventors: Heath Knight-Newbury, Brighton (GB); John Macari, West Sussex (GB)

(73) Assignee: Autoliv Development AB, Vargarda (SE)

( * ) Notice: Subject to any disclaimer, the term of this patent is extended or adjusted under 35 U.S.C. 154(b) by 249 days.

(21) Appl. No.: 10/634,739

(22) Filed: Aug. 5, 2003

(65) Prior Publication Data

US 2004/0079576 A1 Apr. 29, 2004

(30) Foreign Application Priority Data

Aug. 9, 2002 (GB) .................................... 0218617

(51) Int. Cl.
*B60R 21/00* (2006.01)

(52) U.S. Cl. .................. 180/271; 280/5.501; 267/64.24

(58) Field of Classification Search ............. 280/5.501, 280/5.502, 5.514, 5.507; 180/271, 282; 267/64.24, 267/64.1, 64.11; 251/25
See application file for complete search history.

(56) References Cited

U.S. PATENT DOCUMENTS

| | | | |
|---|---|---|---|
| 4,613,116 A * | 9/1986 | Buma ....................... | 267/64.25 |
| 4,794,940 A * | 1/1989 | Albert et al. .................... | 137/1 |
| 4,852,863 A * | 8/1989 | Breitenbacher et al. ..... | 267/218 |
| 5,111,735 A * | 5/1992 | Johnson ........................ | 91/433 |
| 5,413,316 A * | 5/1995 | Easter ...................... | 267/64.24 |
| 6,249,728 B1 * | 6/2001 | Streiter ........................ | 701/37 |
| 6,877,579 B1 * | 4/2005 | Haland ........................ | 180/274 |

FOREIGN PATENT DOCUMENTS

| | | |
|---|---|---|
| GB | 2 355 434 | 4/2001 |
| GB | 2 368 707 | 5/2002 |
| WO | WO-00/15452 | 3/2000 |
| WO | WO-00 71370 | 11/2000 |

* cited by examiner

*Primary Examiner*—David R. Dunn
(74) *Attorney, Agent, or Firm*—Madson & Metcalf

(57) ABSTRACT

A safety arrangement in a motor vehicle includes a sensor (10) and a component (17) of the suspension of the vehicle of adjustable length between a front wheel (16) and a fixed part (14) of the vehicle. The component of adjustable length (17) is associated with a chamber (20) to be filled with fluid, there being a fluid outlet (26) which includes a pilot operated diaphragm valve (36).

20 Claims, 5 Drawing Sheets

SAFETY ARRANGEMENT FOR A MOTOR VEHICLE

BACKGROUND OF THE INVENTION

1. Field of the Invention

THE PRESENT INVENTION relates to a safety arrangement for a motor vehicle, and more particularly, relates to a safety arrangement for a motor vehicle in the form of a light truck, pick-up truck, van or sports utility vehicle.

2. Description of the Related Art

Many vehicles, in the form of motor cars for private use, are provided with front and rear bumpers (also known as fenders), and may also be provided with side bumpers (or fenders). Typically, the bumpers on a motor vehicle are located at such a height above the road that the bumpers on the vehicle will engage the bumpers on another vehicle if the two vehicles are involved in an impact. Typically, the bumpers are located substantially in alignment with the floor-pan of the vehicle, if the vehicle is of monocoque construction, or are located substantially in alignment with the chassis of the vehicle, if the vehicle has a discrete chassis.

The bumpers are thus positioned to receive the energy that is applied to a vehicle in an impact situation and to transfer the energy to the parts of the vehicle structure that have been designed to absorb the energy.

There are nowadays an increasing number of vehicles in use on public roads, which may be described as "high" vehicles, in which the vehicle is provided with a substantial ground clearance, with the consequence that the bumpers provided on such a vehicle are located at a significantly higher level above the road surface than the bumpers on a more conventional "low" vehicle. Examples of such "high" vehicles may include light trucks, pick-up trucks, vans and sports utility vehicles.

When a "high" vehicle of the type described above is involved in impact with a conventional motor car, the bumper on the high vehicle is located substantially above the bumper on the conventional vehicle, and thus, in a frontal impact, the bumpers will not engage one another.

FIG. 1 is a schematic illustration showing a high vehicle 1 about to be involved in a frontal impact with a conventional vehicle 2. It can be seen that the front bumper 3 of the high vehicle 1 is located substantially above the front bumper 4 of the conventional vehicle 2, so that during a frontal impact, the front bumper 3 of the high vehicle 1 will ride up over the front bumper 4 of the conventional vehicle 2. Thus, substantial damage will be caused to the conventional vehicle 2, and the crumple zone provided in the conventional vehicle 2 may not deform in the intended manner.

If a high vehicle 1 is involved in a side impact with a conventional vehicle 2, as shown in FIG. 2, very substantial damage can be caused to the conventional vehicle 2, since the bumper 3 of the high vehicle 1 will impact the conventional vehicle 2 at a level well above that of the floor pan 5 of the conventional vehicle 2. In such a situation, the bumper 3 of the high vehicle 1 will engage the door or side panel 6 of the conventional vehicle 2, and it is to be envisaged that if the high vehicle 1 impacts the conventional vehicle 2 with a velocity in excess of a very low velocity, the door or side panel 6 will be driven inwardly into the interior of the conventional vehicle 2. An occupant of the conventional vehicle 2 may thus be seriously injured.

SUMMARY OF THE INVENTION

It is to be understood, of course, that if a conventional vehicle is involved with a side impact with another conventional vehicle, the front bumper on the first conventional vehicle will be substantially at the level of the floor-pan 5 of the second vehicle.

The present invention seeks to provide a safety arrangement for a motor vehicle which will reduce or obviate the above-mentioned disadvantages of a "high" vehicle of the type described above.

According to the present invention, there is provided a safety arrangement for a motor vehicle, the safety arrangement comprising : a crash sensor configured to sense a potential accident situation involving the vehicle and to generate a signal; and a component of the suspension of the vehicle of adjustable length, located between at least each front wheel of the vehicle and a fixed part of the vehicle structure ;the component of adjustable length comprising a chamber filled with a fluid and having a fluid outlet provided with a valve arrangement, said valve arrangement being actuable in response to said signal to permit fluid to escape from the chamber, thereby reducing the overall length of the chamber to lower at least the front part of the vehicle, relative to the ground, in response to the sensing of a potential accident situation; wherein said valve arrangement comprises a valve seat and a valve member, the valve member being moveable between a first position in which the valve member seals against the valve seat to prevent the flow of fluid therebetween from within the chamber, and a second position in which the valve member is spaced from the valve seat to permit the flow of fluid therebetween from within the chamber, the valve member initially being urged towards said first position by a pilot fluid supply at a pressure substantially equal to or greater than the pressure of the fluid within the chamber, there being provided an actuating arrangement to reduce the pressure of said pilot fluid supply below the pressure of the fluid within the chamber so as to move the valve member towards said second position.

Preferably, said valve member comprises a membrane fixed around its periphery and moveable between a substantially convex configuration and a substantially concave configuration, one side of the membrane being in fluid communication with the pilot fluid supply and the opposite side of the membrane sealing against the valve seat when the membrane adopts said first position.

Advantageously, the membrane is monostable and configured to return to said first position after actuation of the valve arrangement, when the fluid pressure within the chamber reduces to a predetermined level.

Conveniently, the valve arrangement is provided in a side wall of said chamber.

Preferably, said actuating arrangement comprises a second valve arrangement actuable to vent said pilot fluid supply to atmosphere in response to said signal.

Advantageously, said second valve arrangement is actuable by a solenoid.

Conveniently, a suspension unit is provided between the axle or bearing of each front wheel of the vehicle and a fixed part of the vehicle structure, each suspension unit incorporating a said component of adjustable length.

Preferably, the chamber comprises a deformable inflatable element located between two suspension elements, the suspension elements being moveable telescopically relative to each other, but being distanced by the inflatable element, one said suspension element being connected to the fixed part of the vehicle structure and the other suspension element being connected to the axle or bearing of the wheel of the vehicle.

Advantageously, the inflatable element is filled with gas.

Conveniently, an inflator arrangement is provided to inflate the inflatable element when gas has been permitted to escape therefrom by the valve arrangement.

Preferably, the inflator arrangement comprises a compressor configured to supply compressed to the inflatable element and also to the valve member, so as to maintain said pilot fluid supply at the same pressure as the fluid within the inflatable element.

BRIEF DESCRIPTION OF THE DRAWINGS

So that the invention may be more readily understood, and so that further features thereof may be appreciated, an embodiment of the invention will now be described, by way of example, with reference to the accompanying drawings in which.

DETAILED DESCRIPTION OF THE INVENTION

At this stage, it is to be understood that the safety arrangement in accordance. with the present invention includes a sensor arrangement configured to sense a potential accident situation, and also incorporates an adjustment mechanism which adjusts the effective length of a component of the vehicle's suspension so that at least the front part of the vehicle is lowered relative to the ground. The front part of the vehicle will be lowered in a short period of time of the order of 200 ms (0.2 s) and the height of the bumper of the vehicle above the ground may be lowered by at least 100 mm, and preferably by 150–250 mm.

Figure 1:
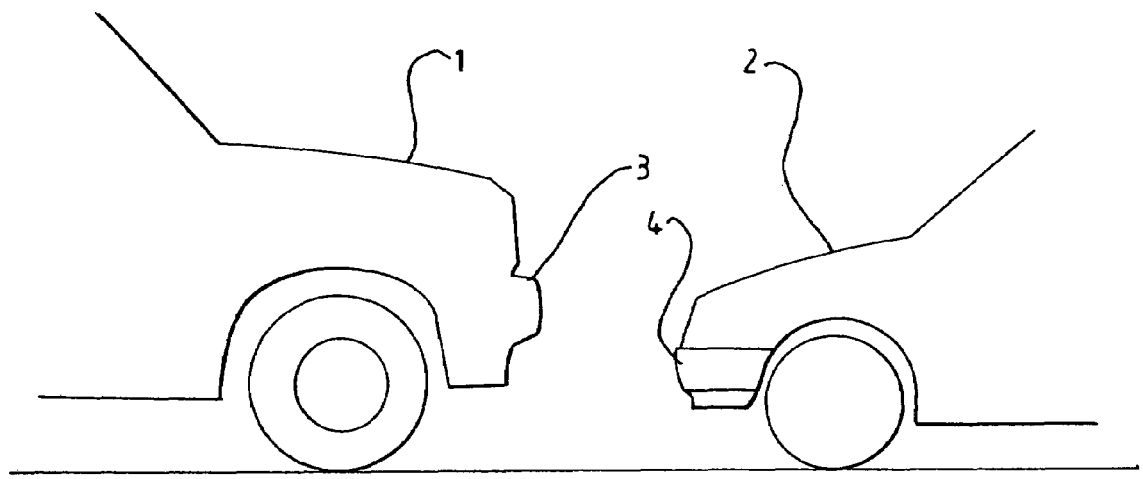
FIG. 1 is a diagrammatic view of a high vehicle and a conventional vehicle before a frontal impact between the two vehicles.
Figure 2:
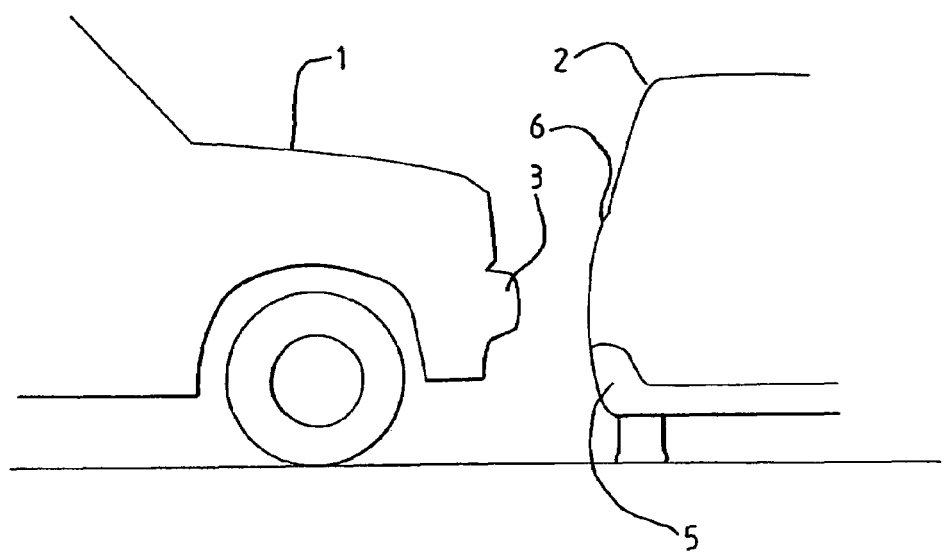
FIG. 2 is a diagrammatic view of a high vehicle and a conventional vehicle before a side impact between the two vehicles.
Figure 3:
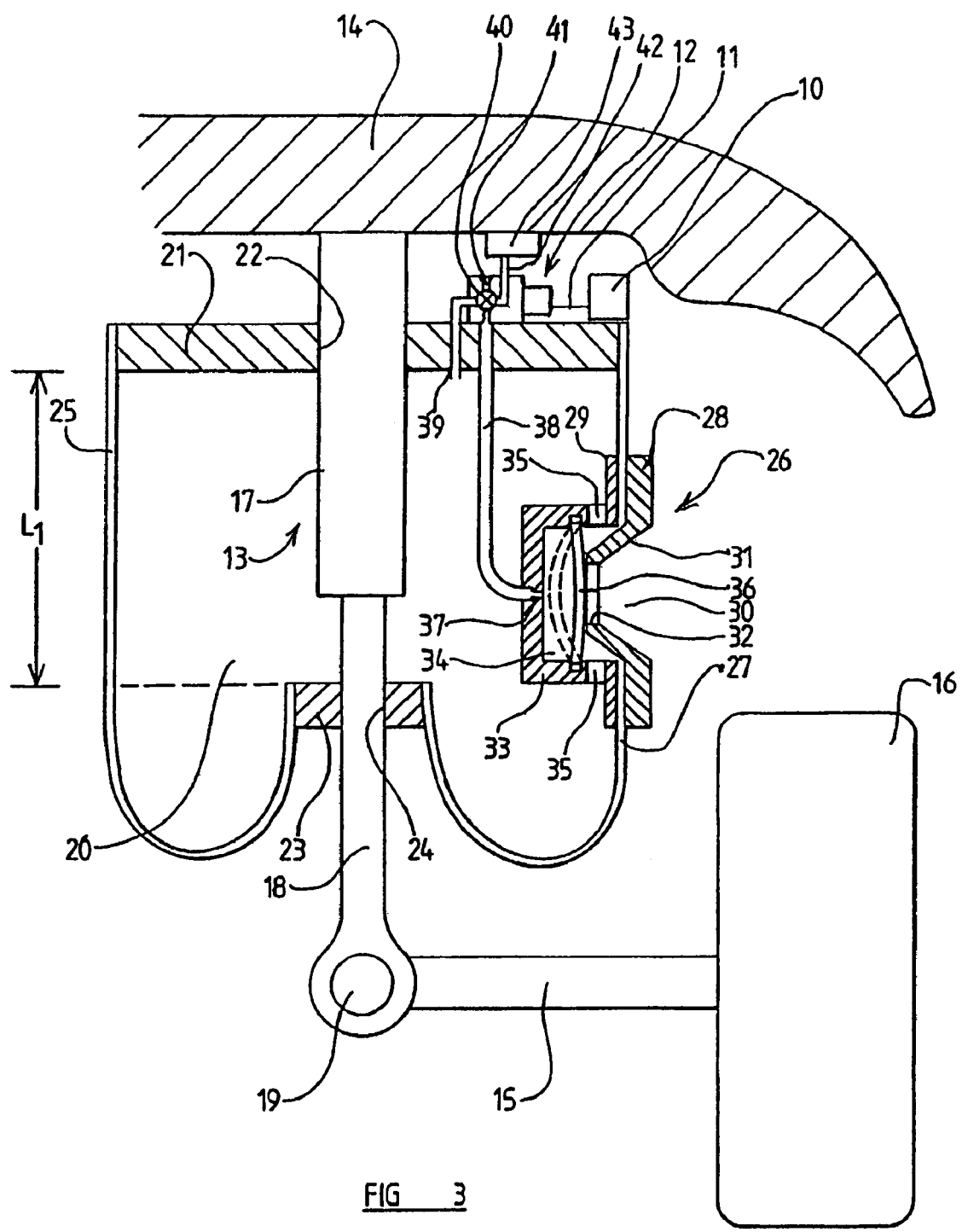
FIG. 3 is a diagrammatic view of a safety arrangement for a motor vehicle in accordance with the invention, illustrating the arrangement in an initial, unactuated condition.

Thus, as shown in FIG. 3, a crash sensor 10 is provided. The sensor 10 may be a radar sensor configured to sense another vehicle within a predetermined range. The radar may be a doppler radar capable of determining the closing speed of the vehicles. However, further types of sensor may be used, such as an optical sensor or an ultra-sonic sensor. The sensor 10 is configured to generate an output signal on line 11 when a potential accident situation is sensed. Line 11 is connected to an actuating arrangement 12 which will be described in more detail hereinafter.

The illustrated arrangement incorporates a suspension unit 13 which is connected between a fixed part 14 of the vehicle structure, and an axle 15 on which one of the front wheels 16 of the motor vehicle is mounted. Two identical suspension units of this type will be provided—one on each side of the vehicle—for each respective front wheel.

The suspension unit 13 takes the form of a generally conventional shock-absorber and includes an upper suspension element 17 comprising a generally cylindrical chamber, the upper part of the chamber being connected to the fixed part 14 of the vehicle structure, and a lower suspension element 18 which is connected (at 19) to the axle 15. The lower suspension element 18 takes the form of a piston which is telescopically received within the upper suspension element 17 in a manner known per se. However, whereas conventional motor vehicle shock-absorbers are generally provided with a helical coil spring therearound, in order to urge the two elements of the shock absorber apart, the safety arrangement of the present invention replaces the coil spring with a gas-filled chamber 20.

The gas-filled chamber 20 comprises an upper chamber element 21 having a substantially central aperture 22 to engage sealingly the outermost surface of the upper suspension element 17. The chamber 20 also comprises a lower chamber element 23 which is provided with a substantially central aperture 24 to engage sealingly the lower suspension element 18, at a position spaced below the lowermost end of the upper suspension element 17. The upper element 21 is fast with the upper suspension element 17 and the lower chamber element 23 is fast with the lower suspension element 18. Interconnecting the upper and lower chamber elements 21, 23, is a resiliently deformable sleeve 25 which is sealingly engaged at its uppermost end around the outer periphery of the upper chamber element 21, and is sealingly engaged at its lowermost end around the outer periphery of the lower chamber element 23. As clearly illustrated in FIG. 3, the length of the sleeve 25 exceeds the normal spacing between the upper and lower chamber elements 21, 23, such that the lower region of the sleeve 25 extends downwardly from the lower chamber element 23 before turning re-entrantly upwardly to extend towards the upper chamber element 21. This excess length provided in the sleeve 25 allows relative movement between the upper and lower chamber elements 21, 23, as the piston 18 of the shock-absorber moves in and out of the chamber 17 of the shock absorber.

A main valve arrangement 26 is provided to seal an aperture formed in the side wall 27 of the sleeve 25. The main valve arrangement 26 comprises a pair of generally annular flanges 28, 29 which are configured to clampingly or otherwise sealingly engage the side wall 27 therebetween, around the periphery of an aperture 30. The outermost flange 28 is provided with a generally frustoconical inwardly-directed duct portion 31 whose innermost extent defines a generally annular valve seat 32 spaced slightly inwardly from the side wall 27 of the sleeve 25.

A valve housing 33 extends rearwardly from the innermost flange 29 around the valve seat 32 so as to define a valve chamber 34 therein. A number of gas-flow apertures 35 are provided through the side wall of the valve housing 33 at positions substantially adjacent the valve seat 32.

A moveable valve member in the form of a resilient membrane 36 is provided within the valve chamber 34, the membrane 36 being sealingly fixed around its periphery to the inner side wall of the valve chamber 34. The membrane 36 is configured so as to be moveable between the substantially. concave position illustrated in bold lines in FIG. 3, in which the outermost surface of the membrane 36 sealingly engages the valve seat 32, to a concave configuration as illustrated in phantom in FIG. 3, in which the outermost surface of the membrane 36 is spaced from the valve seat 32. The membrane 36 is preferably configured so as to be monostable with its stable position being the first position illustrated in bold lines in FIG. 3, in which the membrane sealingly engages the valve seat 32.

The valve housing 33 is provided with a small inlet/outlet aperture 37 in the rear wall of the housing 33, on the opposite side of the membrane to the valve seat 32. A flexible pilot tube 38 is connected to the inlet/outlet aperture 37. The flexible pilot tube 38 extends upwardly, within the gas-filled chamber 20 and extends through an aperture formed in the upper chamber element 21.

Also extending through the upper chamber element 21 is a gas feed tube 39 which extends from the internal volume of the chamber 20 to a second valve arrangement 40 for selective fluid connection to the pilot tube 38, an outlet vent 41 and a gas supply tube 42, the gas supply tube 42 being coupled to a gas supply unit 43 which preferably comprises an air compressor.

In the initial configuration illustrated in FIG. 3, the chamber 20 is filled with gas, and most preferably air (the sleeve 25 thus being an inflatable element), at a predetermined pressure, and the gas feed tube 39 is fluidly connected to the pilot tube 38, so that the valve chamber 34 has a gas pressure equal to that of the chamber 20. Typically, in this condition, the second valve arrangement 40 is arranged to prevent fluid communication between the gas feed tube 39 and the gas supply tube 42, whilst also preventing fluid communication between the pilot tube 38 and the gas supply tube 42. However, in an alternative arrangement, it is envisaged that the second valve arrangement 40 could, during normal running of the motor vehicle, be arranged to connect fluidly both the gas feed tube 39 and the pilot tube 38 to the gas supply tube 42, 50 that the gas supply unit 43 could be operated to maintain and control the pressure of gas within the chamber 20 and hence also within the valve chamber 34, for example, to suit particular driving conditions.

Figure 4:
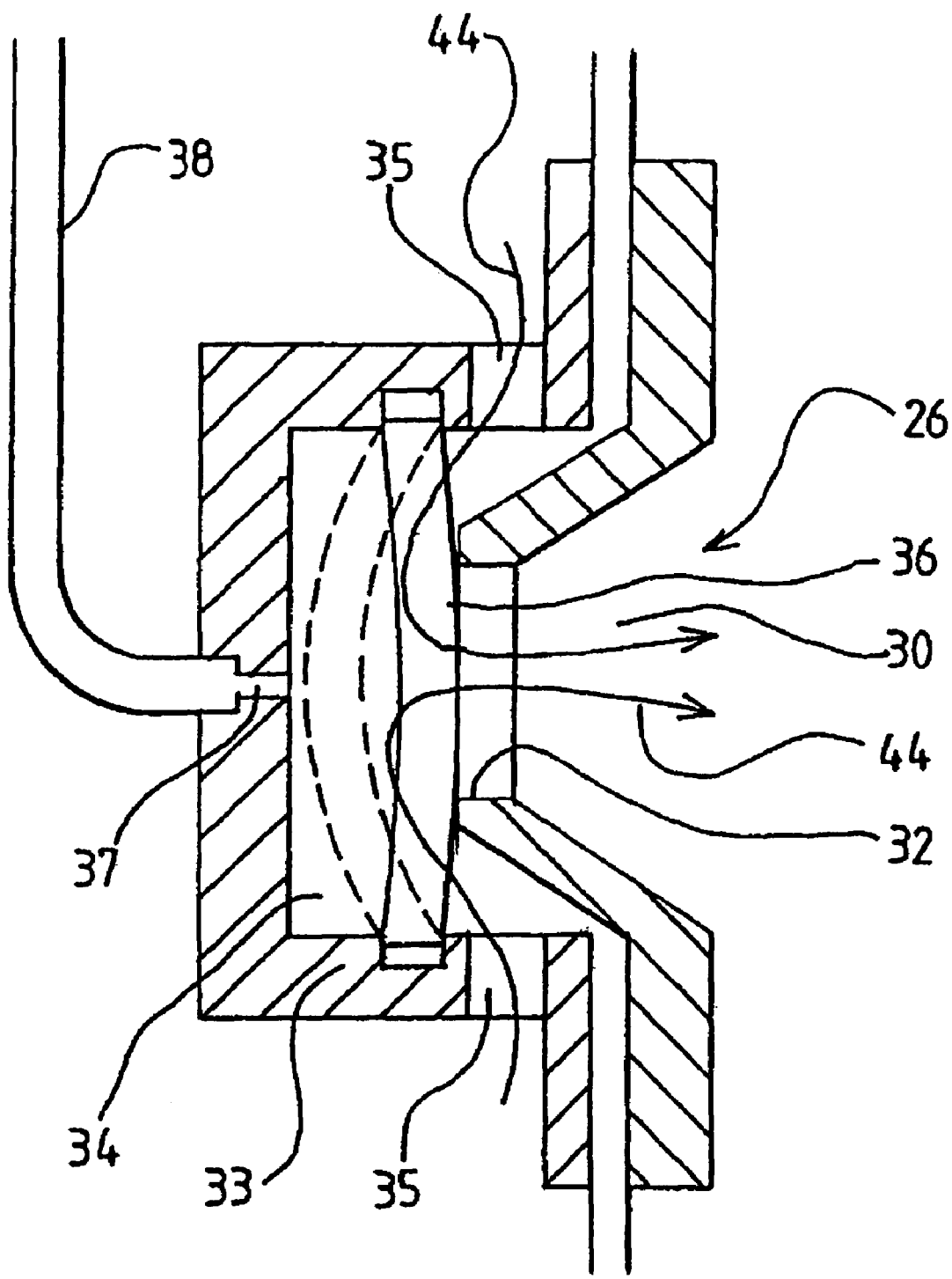
FIG. 4 is an enlarged diagrammatic view of a valve arrangement forming part of the safety arrangement illustrated in FIG. 3.

With particular reference to FIG. 4, the operation of the main valve 26 will now be described. When the valve chamber 34 is held at substantially the same pressure as the gas-filled chamber 20, the membrane 36 remains sealingly engaged with the valve seat 32, hence preventing the flow of gas from the gas-filled chamber 20 out through the aperture 30. This is because, in this condition, there is no pressure differential across the membrane 36, as the pressure of the gas supplied via the pilot tube 38 to the valve chamber 34 and which acts on the inner surface of the membrane 36, is equal to the pressure of the gas within the gas-filled chamber 20 which acts on the outermost surface of the membrane 36 via the apertures 35 in the valve housing 33. Of course, it will readily be appreciated that the membrane 36 would also remain sealingly engaged against the valve seat 32 if the gas pressure within the valve chamber 34 were to be slightly higher than the gas pressure within the gas-filled chamber 20. However, if the pressure of gas within the valve chamber 34 is allowed to drop substantially below the pressure of gas within the gas-filled chamber 20, then the pressure of gas acting on the outer surface of the membrane 36 will clearly exceed the pressure of gas acting on the inner surface of the membrane 36, which will cause the membrane 36 to flip inwardly from the convex configuration illustrated in solid lines, to the concave position illustrated in phantom, which will open up a gas flow path between the membrane 36 and the valve seat 32, thereby allowing gas to flow, as indicated by arrows 44 in FIG. 4, from the interior volume of the gas-filled chamber 20, through the gas-flow apertures 35 in the valve housing 33, between the membrane 36 and the valve seat 32, and outwardly through the aperture 30.

Returning now to consider the safety-arrangement as a whole, with reference to FIG. 3, when the sensor 10 senses the possibility of a potential accident situation involving the motor vehicle, the sensor 10 generates a signal on line 11 which is input into the actuating arrangement 12. The actuating arrangement 12 preferably takes the form of a solenoid arranged to actuate the second valve arrangement 40 upon receipt of the signal from sensor 10, so as to close the gas-feed tube 39, isolate the pilot tube 38 from the gas supply tube 42, and fluidly to connect the pilot tube 38 to the outlet vent 41. Upon moving the valve 40 to such a position, the internal volume of the valve chamber 34 is allowed to vent to the atmosphere, thereby reducing the pressure of gas in the valve chamber 34 below the pressure of the gas in the gas-filled chamber 20, which, in turn, causes the main valve arrangement 26 to actuate as described above, opening up the gas path between the membrane 36 and the valve seat 32.

Figure 5:
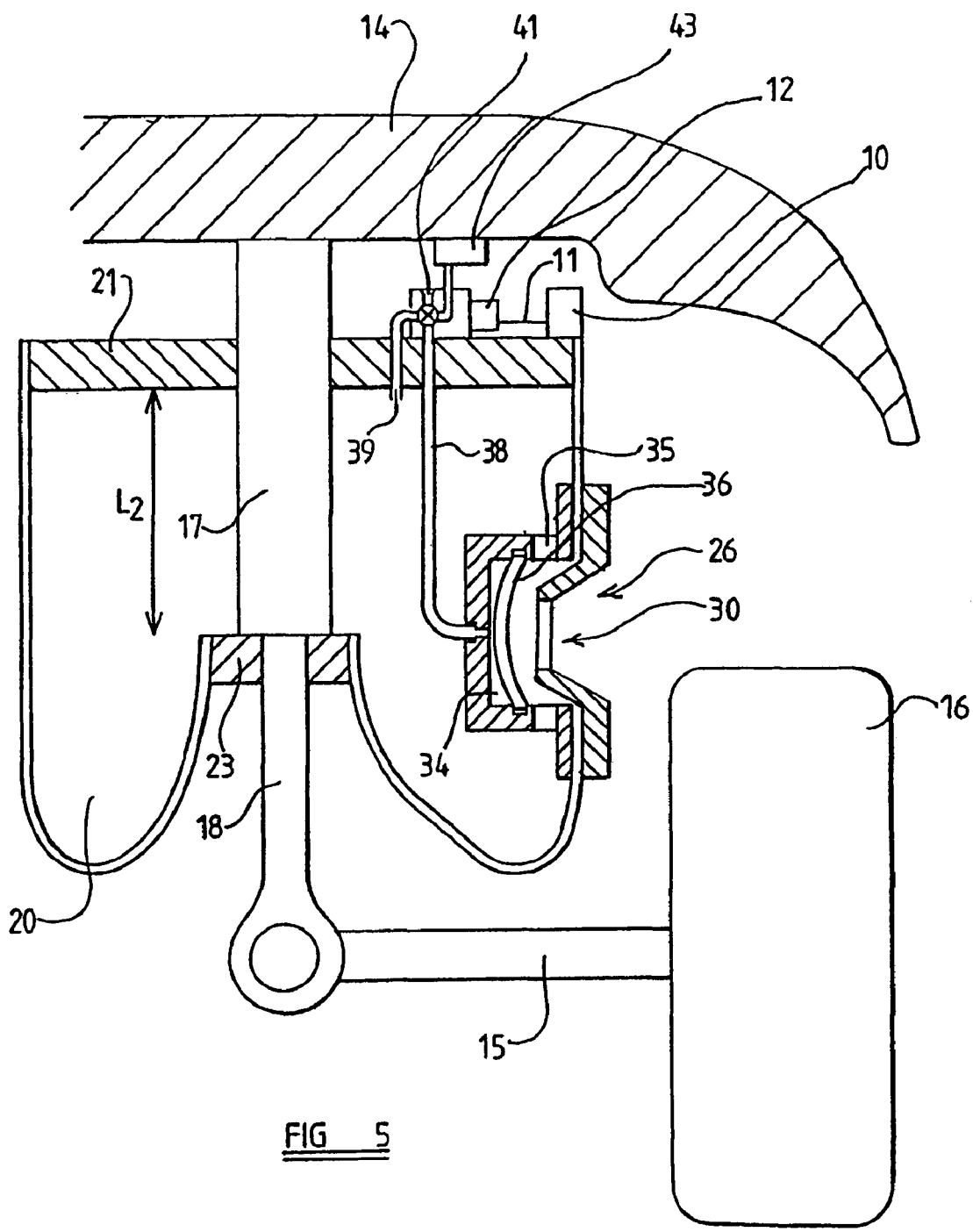
FIG. 5 is a diagrammatic view corresponding generally to that of FIG. 3, but illustrating the safety arrangement in a second, actuated condition.
Figure 6:
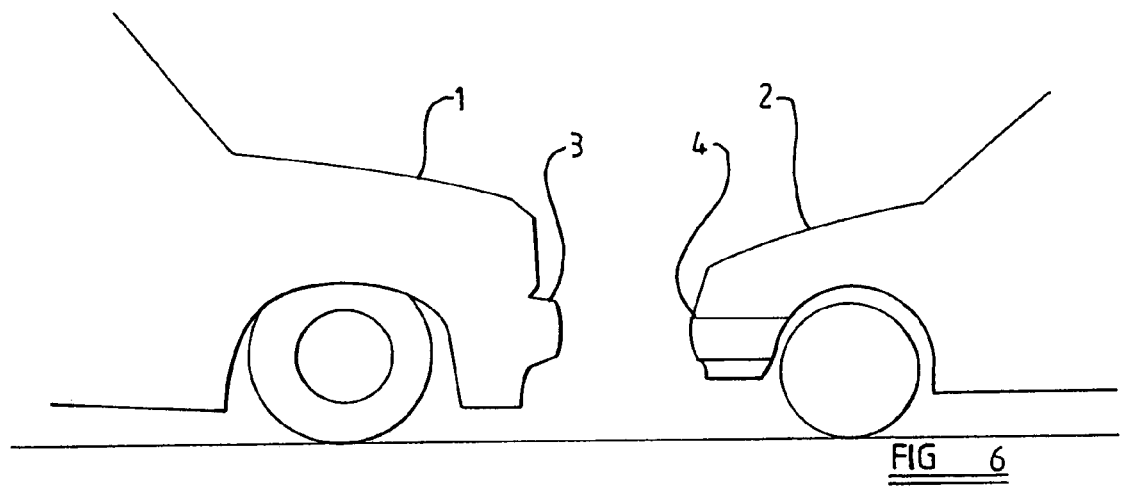
FIG. 6 is a view corresponding generally to FIG. 1 illustrating a high vehicle provided with a safety arrangement in accordance with the invention, and a conventional vehicle before a frontal impact between the two vehicles.

It will therefore be appreciated that, when the flow path between the membrane 36 and the valve seat 32 is opened, gas from within the gas-filled chamber 20 is forced out through the aperture 30, thereby reducing the volume of gas within the chamber 20. Due to the weight of the vehicle pressing downwardly, the initial length L1 defined between the upper chamber element 21 and the lower chamber element 23 is reduced to a lesser length L2 as shown in FIG. 5. The lower suspension element 18 is telescopically received within the upper suspension element 17, and the distance between the fixed part 14 of the vehicle structure and the axle 15 supporting the wheel 16 is reduced. Thus, the combination of the suspension elements 17,18 and the gas-filled chamber 20 (which represents an inflatable element) form a component of adjustable length, and the main valve arrangement 26 acts to adjust the length of that component upon actuation of the second valve arrangement 40.

As can be seen from FIG. 5, if a high vehicle 1, having a front bumper 3, provided with the safety arrangement illustrated in FIGS. 3 to 5, is involved in a potential accident situation that may lead to a frontal impact, as soon as a potential accident situation is sensed, second valve arrangement 40 is actuated so that the pilot tube 38 is vented to atmosphere, thereby actuating the main valve arrangement 26, and allowing gas from the gas-filled chamber 20 to escape through the aperture 30, and the whole of the front of the high vehicle 1 is lowered so that the bumper 3 of the high vehicle 1 is then at a level substantially in alignment with the front bumper 4 of a conventional vehicle 2. Thus, both of the vehicles are better able to withstand the impact with a reduced risk of injury occurring to the occupants of either of the vehicles, especially to the occupants of the conventional vehicle.

Figure 7:
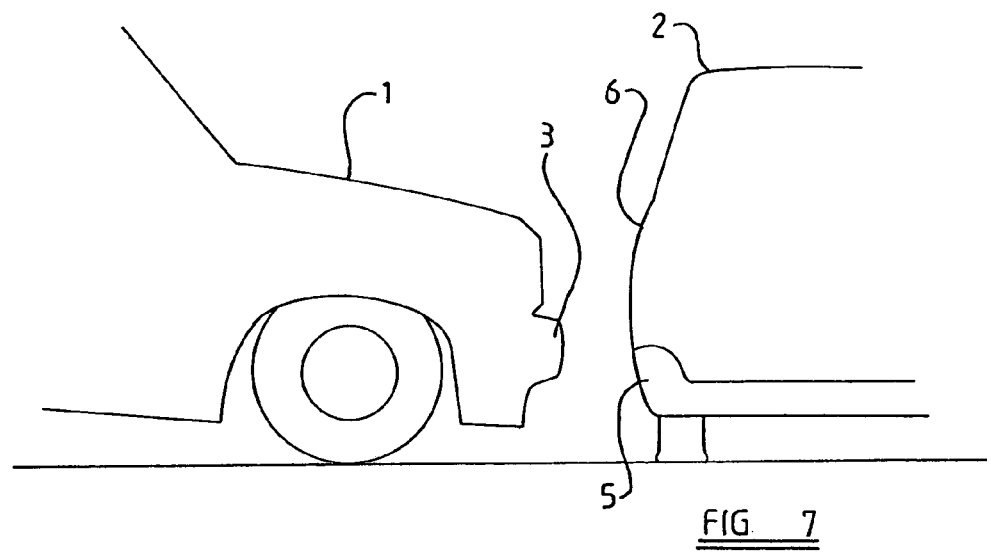
FIG. 7 is a view corresponding to FIG. 2, illustrating a high vehicle provided with a safety arrangement in accordance with the present invention, and a conventional vehicle before a side impact between the two vehicles.

Referring to FIG. 7, it can be seen that if a high vehicle 1 provided with a safety arrangement as described with reference to FIGS. 3 to 5 is involved in a situation where there is a possibility of a side impact with a conventional vehicle 2, again the front part of the high vehicle 1 will be lowered so that the bumper 3 is substantially in alignment with the floor-pan 5 of the conventional vehicle 2. Thus, the risk of substantial damage being imparted to the conventional vehicle 2 is again reduced.

It is to be appreciated that once the valve arrangement 26 has been actuated to allow gas to escape from the gas-filled chamber 20, it will be necessary to replace that gas before the said arrangement is ready for re-use, allowing the vehicle to be driven safely. Thus, the actuating arrangement 12 can be operated to actuate the second valve arrangement 40 so that the outlet vent 41 is closed, and so that both the pilot tube 38 and the gas-feed tube 39 are fluidly connected to the gas-supply tube 42. Thereafter, the fluid supply unit (most preferably a compressor) 43 can be actuated to supply gas (most preferably air) to both the interior volume of the gas-filled chamber 20, and to the valve chamber 34.

It is to be appreciated that in the event that the valve membrane 36 is monostable as described above, then when a sufficient volume of gas has been released from the interior volume of the gas-filled chamber 20, the membrane 36 will automatically flip back to its concave configuration illustrated in bold lines in FIGS. 3 and 4, in which it seals against the valve seat 32. However, if the membrane 36 is not monostable, then the supply of gas down the pilot tube 38 from the gas supply 43 will increase the pressure of gas within the valve chamber 34, thereby flipping the membrane 36 back to its concave configuration.

The gas supply 43 continues to supply gas to the interior volume of the gas-filled chamber 20 until such time as the pressure of gas within the chamber 20 returns to its initial value, thereby returning the length between the upper and lower chamber elements 21, 22 to L1, thereby raising the front end of the vehicle back to its original ride height.

Whilst the invention has been described with reference to certain preferred embodiments, it is to be appreciated that many modifications may be made without departing from the scope of the invention. Whilst reference has been made to the front part of the vehicle being lowered in response to a potential accident situation being sensed, it is possible that the entire vehicle may be lowered. Also, whilst reference has been made to the use of gas (most preferably air) to fill the chamber 20 and operate the main valve arrangement 26, other arrangements could use other fluids, including liquid.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A safety arrangement for a motor vehicle having a suspension, the safety arrangement comprising:
   a crash sensor configured to sense a potential accident situation involving the vehicle and to generate a signal;
   a component of the suspension of the vehicle of adjustable length, located between at least each front wheel of the vehicle and a fixed part of the vehicle structure;
   the component of adjustable length comprising a chamber filled with a fluid and having a fluid outlet provided with a valve arrangement, said valve arrangement being actuable in response to said signal to permit fluid to escape from the chamber, thereby reducing the overall length of the chamber to lower at least the front part of the vehicle, relative to the ground, in response to the sensing of a potential accident situation;
   wherein said valve arrangement comprises a valve seat and a valve member, the valve member being moveable between a first position in which the valve member seals against the valve seat to prevent the flow of fluid between the valve member and the valve seat from within the chamber, and a second position in which the valve member is spaced from the valve seat to permit the flow of fluid between the valve member and the valve seat from within the chamber, the valve member initially being urged towards said first position by a pilot fluid supply at a pressure substantially equal to or greater than the pressure of the fluid within the chamber, there being provided an actuating arrangement to reduce the pressure of said pilot fluid supply below the pressure of the fluid within the chamber so as to move the valve member towards said second position; and
   wherein said valve member comprises a membrane fixed around its periphery and moveable between a substantially convex configuration and a substantially concave configuration, one side of the membrane being in fluid communication with the pilot fluid supply and the opposite side of the membrane sealing against the valve seat when the membrane adopts said first position.

2. A safety arrangement according to claim 1, wherein the membrane is monostable and configured to return to said first position after actuation of the valve arrangement, when the fluid pressure within the chamber reduces to a predetermined level.

3. A safety arrangement according to claim 1, wherein the valve arrangement is provided in a side wall of said chamber.

4. A safety arrangement according to claim 1, wherein said actuating arrangement comprises a second valve arrangement actuable to vent said pilot fluid supply to atmosphere in response to said signal.

5. A safety arrangement according to claim 4, wherein said second valve arrangement is actuable by a solenoid.

6. A safety arrangement according to claim 1, wherein a suspension unit is provided between the axle or bearing of each front wheel of the vehicle and a fixed part of the vehicle structure, each suspension unit incorporating a said component of adjustable length.

7. A safety arrangement according to any claim 6, wherein the chamber comprises a deformable inflatable element located between two suspension elements, the suspension elements being moveable telescopically relative to each other, but being distanced by the inflatable element, one said suspension element being connected to the fixed part of the vehicle structure and the other suspension element being connected to the axle or bearing of the wheel of the vehicle.

8. A safety arrangement according to claim 7, wherein the inflatable element is filled with gas.

9. A safety arrangement according to claim 8, wherein an inflator arrangement is provided to inflate the inflatable element when gas has been permitted to escape therefrom by the valve arrangement.

10. A safety arrangement according to claim 9, wherein the inflator arrangement comprises a compressor configured to supply compressed gas to the inflatable element and also to the valve member, so as to maintain said pilot fluid supply at the same pressure as the fluid within the inflatable element.

11. A safety arrangement for a motor vehicle having a suspension, the safety arrangement comprising:
    a crash sensor configured to sense a potential accident situation involving the vehicle and to generate a signal;
    a component of the suspension of the vehicle of adjustable length, located between at least each front wheel of the vehicle and a fixed part of the vehicle structure;

the component of adjustable length comprising a chamber filled with a fluid and having a fluid outlet provided with a valve arrangement, said valve arrangement being actuable in response to said signal to permit fluid to escape from the chamber, thereby reducing the overall length of the chamber to lower at least the front part of the vehicle, relative to the ground, in response to the sensing of a potential accident situation;

wherein said valve arrangement comprises a valve seat and a valve member, the valve member being moveable between a first position in which the valve member seals against the valve seat to prevent the flow of fluid between the valve member and the valve seat from within the chamber, and a second position in which the valve member is spaced from the valve seat to permit the flow of fluid between the valve member and the valve seat from within the chamber, the valve member initially being urged towards said first position by a pilot fluid supply at a pressure substantially equal to or greater than the pressure of the fluid within the chamber, there being provided an actuating arrangement to reduce the pressure of said pilot fluid supply below the pressure of the fluid within the chamber so as to move the valve member towards said second position; and wherein said valve member comprises a membrane which is monostable and configured to return to said first position after actuation of the valve arrangement, when the fluid pressure within the chamber reduces to a predetermined level.

12. A safety arrangement according to claim 11, wherein said valve member comprises the membrane fixed around its periphery and moveable between a substantially convex configuration and a substantially concave configuration, one side of the membrane being in fluid communication with the pilot fluid supply and the opposite side of the membrane sealing against the valve seat when the membrane adopts said first position.

13. A safety arrangement according to claim 11, wherein the valve arrangement is provided in a side wall of said chamber.

14. A safety arrangement according to claim 11, wherein said actuating arrangement comprises a second valve arrangement actuable to vent said pilot fluid supply to atmosphere in response to said signal.

15. A safety arrangement according to claim 14, wherein said second valve arrangement is actuable by a solenoid.

16. A safety arrangement according to claim 11, wherein a suspension unit is provided between the axle or bearing of each front wheel of the vehicle and a fixed part of the vehicle structure, each suspension unit incorporating a said component of adjustable length.

17. A safety arrangement according to any claim 16, wherein the chamber comprises a deformable inflatable element located between two suspension elements, the suspension elements being moveable telescopically relative to each other, but being distanced by the inflatable element, one said suspension element being connected to the fixed part of the vehicle structure and the other suspension element being connected to the axle or bearing of the wheel of the vehicle.

18. A safety arrangement according to claim 17, wherein the inflatable element is filled with gas.

19. A safety arrangement according to claim 18, wherein an inflator arrangement is provided to inflate the inflatable element when gas has been permitted to escape therefrom by the valve arrangement.

20. A safety arrangement according to claim 19, wherein the inflator arrangement comprises a compressor configured to supply compressed gas to the inflatable element and also to the valve member, so as to maintain said pilot fluid supply at the same pressure as the fluid within the inflatable element.

* * * * *

UNITED STATES PATENT AND TRADEMARK OFFICE
CERTIFICATE OF CORRECTION

| | |
|---|---|
| PATENT NO. | : 6,988,577 B2 |
| APPLICATION NO. | : 10/634739 |
| DATED | : January 24, 2006 |
| INVENTOR(S) | : Heath Knight-Newbury et al. |

It is certified that error appears in the above-identified patent and that said Letters Patent is hereby corrected as shown below:

Column 5, line 39, please delete "tube 42, 50 that the" and replace it with --tube 42, so that the--.

Signed and Sealed this

Fourth Day of July, 2006

JON W. DUDAS
*Director of the United States Patent and Trademark Office*